May 3, 1966  L. A. KELLER ETAL  3,248,948
DUAL TEST MANOMETER AND FITTINGS THEREFOR
Filed Jan. 16, 1963  3 Sheets-Sheet 1
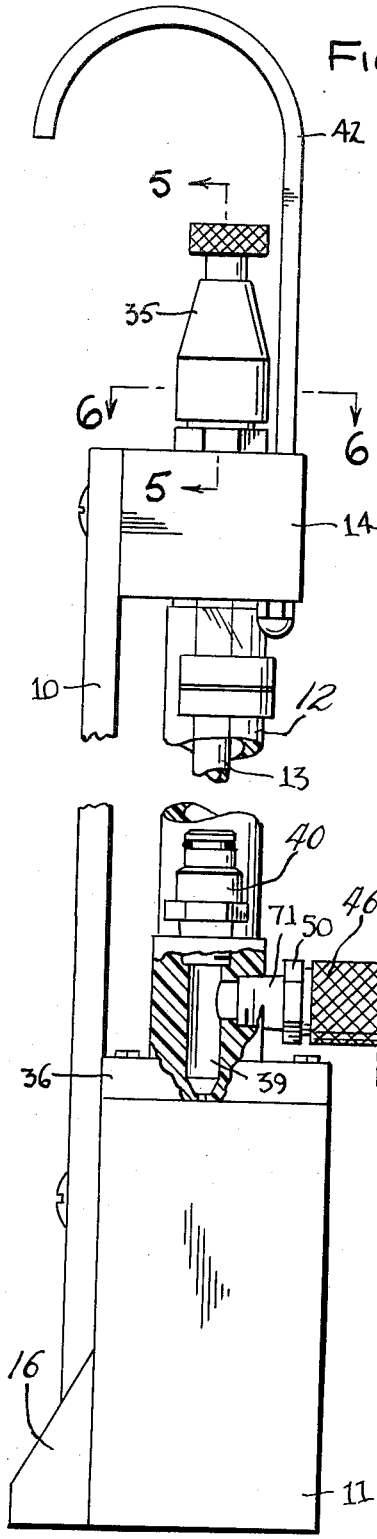
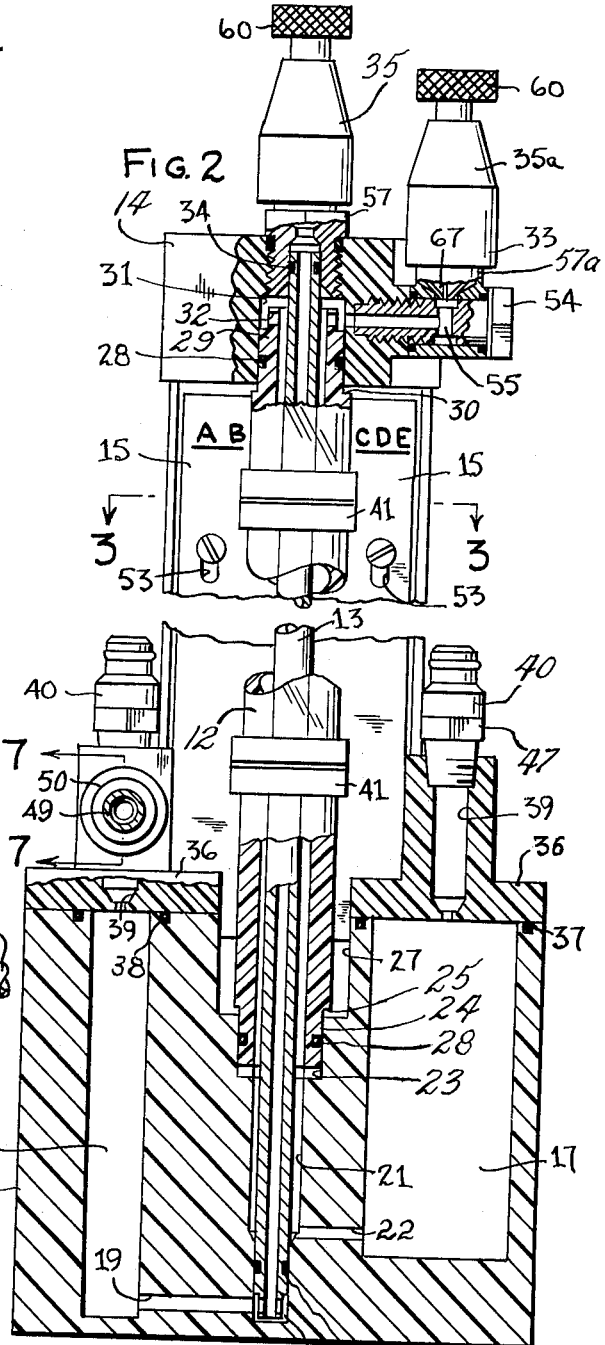
INVENTORS.
LEONARD A. KELLER & SAMUEL R. ROSEN
BY
ATTORNEYS.

May 3, 1966 L. A. KELLER ETAL 3,248,948
DUAL TEST MANOMETER AND FITTINGS THEREFOR
Filed Jan. 16, 1963 3 Sheets-Sheet 2

INVENTORS.
LEONARD A. KELLER & SAMUEL R. ROSEN
BY
ATTORNEYS.

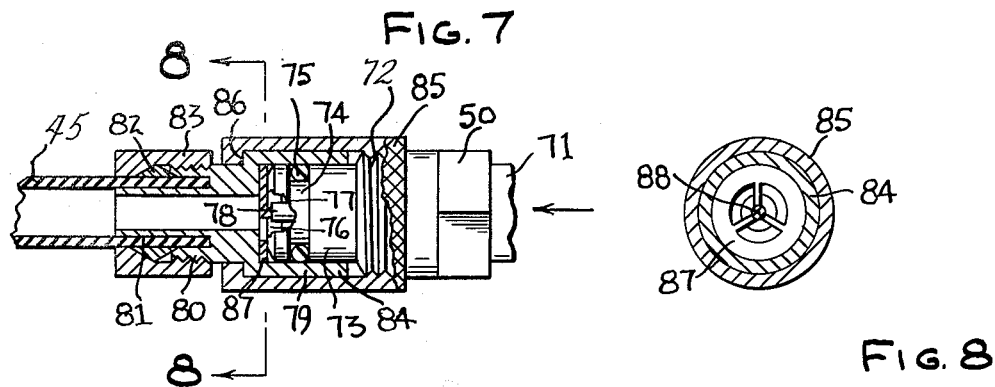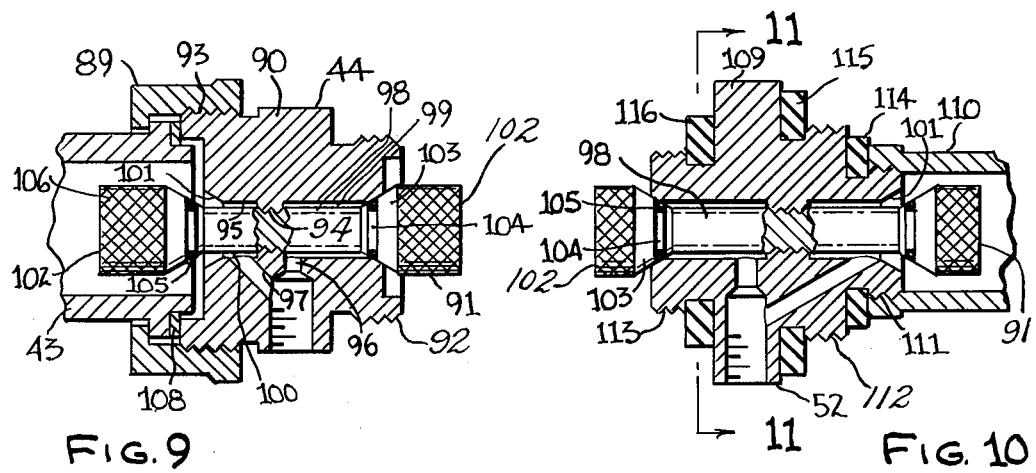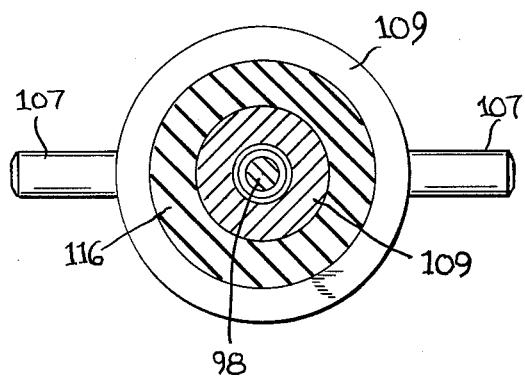

United States Patent Office 3,248,948
Patented May 3, 1966

3,248,948
DUAL TEST MANOMETER AND FITTINGS
THEREFOR
Leonard A. Keller and Samuel R. Rosen, Lorain, Ohio, assignors to Rolson Corporation, Lorain, Ohio, a corporation of Ohio
Filed Jan. 16, 1963, Ser. No. 251,919
4 Claims. (Cl. 73—401)

The present invention relates generally to the field of pressure measuring devices, and more particularly, to fluid column measuring devices of the type generally designated as manometers.

A manometer, embodying the principles which we describe herein, will have general utility in any of the applications where manometers are generally used, however, our concept is directed particularly to a type of manometer which is to be utilized for test purposes on fuel gas lines and the like. Therefore, our description of the manometer herein will be cast in the environment of the testing of gas lines, but it is to be understood that we do not intend this to constitute any limitation upon the uses to which the novel principles herein disclosed may be adapted.

In homes, for example, where fuel gas is used for cooking or heating, it is customary to supply to fuel gas from an external supply source and utilize it at relatively low operating pressures, e.g. two ounces per square inch, in the internal home lines which connect to the various fixtures or devices which employ gas. The external supply source might be at a relatively higher pressure which is reduced by suitable means to the desired lower operating pressure for home use. There are various conditions and circumstances under which both the internal and external gas lines must be tested for tightness or the existence of leaks. Inasmuch as the various controls which are used on the home gas fixtures are ordinarily not designed to withstand pressures greater than one pound p.s.i., the home system must be tested at a relatively low test pressure, although the external lines are tested at higher pressures, e.g. 10 pounds p.s.i. This is done by applying a reasonable test pressure to the closed system and determining, by means of a measuring device, that the system will contain the test pressure without loss over a selected period of time. Due to the low pressures involved in the home system, the mechanical or dial type of pressure measuring instrument has generally not been favored for test purposes, and portable manometers have been used.

It is a primary object of our invention to provide a test manometer instrument of a portable nature, which will embody therein means for testing over a broad range of pressures.

Another object of our invention is to provide a portable manometer of the character described, which is provided with means for preventing and minimizing the inadvertent loss or spillage of the fluid columns.

A further object of our invention is to provide a portable test manometer of the character described, which is so constructed as to minimize the possibility of inadvertent breakage of its gauge colums.

Another object of our invention is to provide a manometer of the character described which eliminates all manual valving and automatically seals the fluid reservoir when the device is disconnected from use.

Still another object of our invention is to provide a manometer of the character described with detachable coupling assemblies which will substantially prevent any loss of test pressure in the system when the pressure producing source is disconnected from the manometer.

A further object of our invention is to provide a manometer of the character described with improved means for temporarily coupling it into the fuel gas system to be tested.

Other objects and advantages of our invention will be apparent during the course of the following description.

In the accompanying drawings forming a part of this specification and in which like numerals are employed to designatee like parts throughout the same, FIG. 1 is a view in side elevation of a manometer embodying the principles of our invention, portions thereof being broken away to show details of construction.

FIG. 2 is a view in front elevation of the manometer of FIG. 1, with portions thereof broken away to show details of construction.

FIG. 7 is an enlarged fragmentary cross-sectional view of the coupling, taken as indicated on line 7—7 of FIG. 2.

FIG. 8 is an enlarged fragmentary cross-sectional view of the same, taken as indicated on line 8—8 of FIG. 1 or FIG. 7.

FIG. 9 is a longitudinal cross-sectional view of one of the adapter fittings shown in FIG. 4.

FIG. 10 is a longitudinal cross-sectional view of a form of adapter, such as the other adapter shown in FIG. 4, and FIG. 11 is a cross-sectional view of the same taken as indicated on line 11—11 of FIG. 10.

Figure 3:
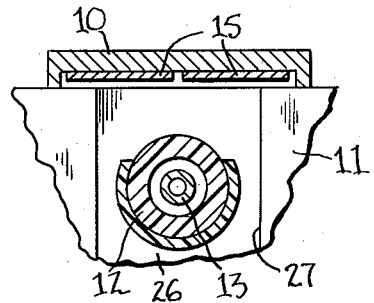
FIG. 3 is a cross-sectional view taken as indicated on line 3—3 of FIG. 2.

Referring more particularly to FIGS. 1-3 of the drawings, we have shown a manometer instrument which includes a base 11, a water gauge column 12, a coaxially disposed mercury gauge column 13, a cap 14 surmounting the gauge columns, and reading scales 15 disposed adjacent to the gauge columns 12 and 13 and secured to a back 10, which also serves to interconnect the base 11 and cap 14.

The base 11 is a block of molded or machined synthetic resin of sufficient volume to provide a reservoir for the gauge fluids which are employed. The base may be provided with an extension or projection, as indicated at 16, so as to provide a stable support for maintaining the manometer in upright standing position when it is in use. The base is provided with an open or exposed chamber or well 17 in one part thereof, and is provided with a relatively smaller chamber or well 18 in another part thereof. The smaller chamber 18 is intended to be filled with a heavy gauge fluid, such as mercury, and it communicates through a channel 19 with a vertical bore 20 which is provided centrally of the base 11 between the chambers 17 and 18. The bore 20 is counterbored as at 21, and this counterbore communicates through a channel 22 with the well 17. The well 17 is intended to receive water or a gauge fluid of substantially comparable specific gravity, which is considerably lighter than the gauge fluid used in the chamber 18.

The bore 20 is further counterbored as at 23 to receive the lower end 24 of the transparent gauge tube or column 12. The end 24 is of reduced external diameter so as to provide a retaining shoulder 25 adjacent the lower end of the tube 12. This shoulder overlies, but does not abut, the bottom surface 26 of a median notch or recess 27 which extends through the upper portion of the base 11 from the front to the back thereof. An O-ring or other suitable sealing element 28 is carried by the lower end 24 of the tube 12 and engages the wall of the counterbore 23 to provide a fluid-tight seal therein, although not preventing axial movement of the tube. The interior of the tube 12 is exposed to the counterbore 21 and thus communicates with the chamber 17.

The upper end 29 of the tube 12 is of reduced diameter and provides a retaining shoulder 30, comparable to the shoulder 25 previously described. The upper end of the tube is slidably received in a central bore 31 of the cap 14 and is provided with an O-ring 28 for fluid-tight sealing engagement with the wall of the bore 31. An aperture or slot 32 is provided in the wall of the upper end 29, so as to permit the interior of the tube 12 to communicate with a vent assembly 33 which is secured to the cap 14. The details of the vent assembly will be described later herein.

Extending axially through the interior of the water tube 12 is the mercury tube 13, whose external diameter is less than the internal diameter of the tube 12. The lower end of the tube 13 is slidably received in the bore 20 and is provided with an O-ring 34 to establish a fluid-tight seal therein. The interior of the tube 13 thus communicates through channel 19 with the well or chamber 18 in the base 11. The upper end of the tube 13 is also provided with an O-ring 34 and is received in fluid-tight engagement by a vent fitting 35 which is secured to the cap 14.

The well or chamber 17 is sealed by means of a cover 36 which is bolted or otherwise detachably secured to the base 11 in fluid-tight engagement with a sealing ring 37 provided therein. Similarly, the well or chamber 18 is provided with a cover 36 which engages a sealing ring 38 on the base 11. Each of the covers 36 is provided with a bore 39 whose lower end communicates with the respective well 17 or 18 and whose upper end is sealed by a valve assembly 40 which is secured to the cover 36. The covers 36 may be removed for the purpose of filling or emptying the chambers 17 and 18. Ordinarily, the chamber 17 will contain water or ethylene glycol or mixtures thereof to which a coloring agent may be added to enhance the visibility of the fluid in the gauge column. The chamber 18 will ordinarily contain mercury. The base 11, which is formed of a suitable synthetic resin, is compatible with both of these gauge fluids, thereby permitting the provision of both chambers 17 and 18 in a single unitary base member.

Although both the tubes 12 and 13 could be glass, we prefer that, at least the exterior tube 12, be formed of a less brittle substance such as, for example, a transparent synthetic resin of the polyethylene or polystyrene family. It is desirable that at least one, and preferably two, position markers 41 be retractable mounted for longitudinal movement on the exterior of the water tube 12. It is also desirable that the cap 14 have a suitably formed element 42 secured thereto which will serve as a convenient means for hanging or suspending the manometer, if this is necessary during storage or use.

Figure 4:
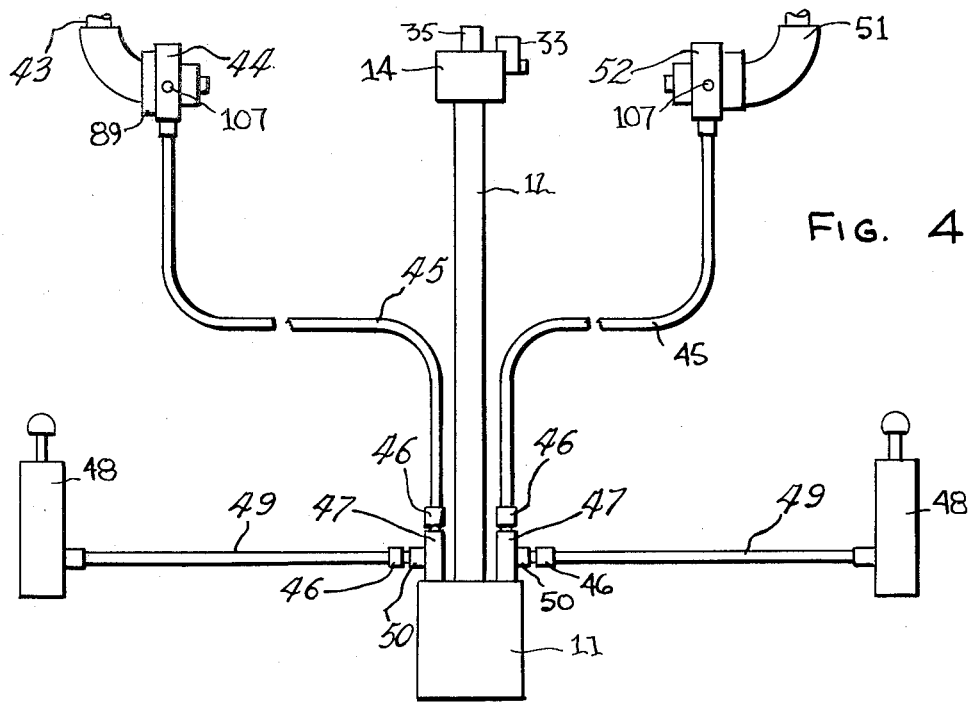
FIG. 4 is a schematic representation of the manner in which the test manometer is connected to the gas line system.

The manner in which the manometer is used is indicated in FIG. 4 of the drawings. A high pressure gas line 43, which is to be tested, is connected by means of an adapter 44 and connecting hose or conduit 45, equipped with coupling 46, to a valve 47 of the valve assembly 40 which is associated with the mercury chamber 18. A suitable source of air pressure, which may be a hand-operated pump or aspirator 48, is connected through hose 49 and coupling 46 to the other valve 50 of this valve assembly.

The low pressure gas line 51, which is to be tested, is connected through an adapter 52 in a similar manner to the valve 47 of the valve assembly 40 which communicates with the water chamber 17. A second independent air pressure source 48 is connected to the other valve 50 of this valve assembly.

It will be understood that one of the hand pumps 48 is actuated to impress an air pressure simultaneously upon the gas line to be checked and upon the associated gauge fluid. This causes the column of gauge fluid to rise in its tube 12 or 13 until the desired pressure is reached, as indicated by the registry of the fluid level or meniscus on the reading scale 15. Similarly, the other hand pump 48 is actuated to impress air pressure upon the other gas line and gauge fluid to obtain a reading of the desired pressure on the manometer. Both readings are marked by means of the slidable position markers 41 and any drop in the pressure of either system can then be observed after an appropriate interval of time. The mercury in the inner tube 13 will be visible through the outer tube 12 regardless of the relative levels of the two gauge fluids in the tubes. Thus, the pressure testing of two separate gas lines or the like can be accomplished simultaneously with a single instrument, even though one of the lines requires a test at substantially higher pressures than the other of the lines. Although we have referred to the fact that two independent pressure sources 48 would be utilized, it will be understood that such an arrangement is preferable from the standpoint of efficiency, both in making the necessary connections and in saving time, but this does not preclude the use of a single hand pump 48 which is alternatively connected to one and then the other of the valves 50. It should also be noted that, under certain circumstances where both gas lines are to be tested at the same test pressure, both of the valves 50 can be coupled to a single common pressure source 48 so that the test pressure is imposed simultaneously upon both systems, but, after the pressure source is disconnected from the instrument, each test line system will provide its own pressure test reading on the instrument independently of the other. This arrangement not only permits the simultaneous testing of two separate lines at the same test pressure, but also serves as a means of testing the accuracy of the two fluid gauge columns, which should give an initial identical reading of pressure on their respective scales. This latter test of the instrument itself can also be performed by using a hose or the like to interconnect the two valves 47 and impressing the air pressure at one or the other of the valves 50. Slots 53 may be provided in the mercury and water reading scales to permit relative adjustment of these scales to compensate for any slight discrepancy that might be detected as a result of such a uniform pressure test on the instrument.

It will be apparent that the coaxial arrangement of the columns or tubes 12 and 13 not only serves to provide a more compact and unified manometer arrangement, but also serves to protect the inner mercury-containing tube against breakage. Thus, the outer tube 12 functions as a guard or shield for the inner tube 13, as well as functioning as a gauge column. It will also be noted that the manner of mounting the tubes 12 and 13 permits them to have sufficient slidable movement to accommodate any changes in their length which would occur as a result of temperature contraction or expansion, thus eliminating the possibility of distorting or breaking the tubes as a result of such temperature stresses.

Figure 5:
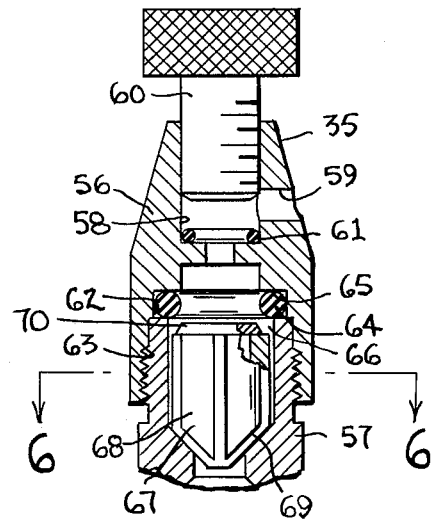
FIG. 5 is an enlarged fragmentary cross-section of the vent fitting, taken as indicated by line 5—5 on FIG. 1.
Figure 6:
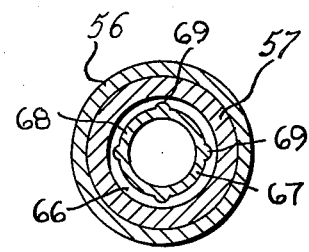
FIG. 6 is an enlarged fragmentary cross-sectional view of the same taken as indicated on line 6—6 of FIG. 1 or FIG. 5.

Referring more particularly to FIGS. 2, 5 and 6 of the drawings, the vent assembly 33 includes a float valve 35a which is disposed vertically or substantially parallel to the longitudinal axis of the tube 12. The vent assembly 33 also includes a transversely extending fitting 54 threadedly secured to the cap 14 and provided with an internal channel arrangement 55 by means of which the float valve 35a communicates with the interior of the tube 12. The float valve 35a is provided with a body 56 to which is threadedly secured a float support member 57a whose lower portion is especially adapted ot be mounted on and secured by the transverse fitting 54. In this respect, it differs from the float valve 35, which has a float support member 57 whose lower portion is threaded for direct securement to the cap 14 in direct communication with the interior of the tube 13. In all other respects, the valves 35 and 35a are identical in function and structure, therefore a description of the valve 35 will suffice to also describe the valve 35a.

The body 56 of the valve 35 is provided with a central bore 58 which is intersected by a transverse channel 59 open to atmosphere. A valve screw 60 threadedly engages the bore 58 and can be selectively seated on an O-ring 61 in the bore to seal the bore against communication with the vent channel 59. The bore 58 leads into a larger cavity 62 in the body 56 which is counterbored and internally threaded as at 63 to receive the float support member 57 or 57a, as the case may be. The counterbore 63 provides a shoulder 65 which is recessed to receive an O-ring 64 against which the float support member 57 is seated. The member 57 has a central float chamber 66 which communicates with the interior of the tube 12 or the tube 13, as the case may be. Retained within the chambers 66 is a hollow float 67 which can be made of any suitable material such as, molded synthetic resin, light metal or rubber. The float has a cylindrical body 68 which is provided with circumferentially-spaced radially projecting flutes or vanes 69 which define air passages between the body 68 and the wall of the float chamber 66. The flutes 69 are of such dimension as to permit free vertical movement of the float 67 within the float chamber 66, while at the same time guiding the float in such movement. The body 68 is surmounted by a conical seat 70 which is adapted to engage the O-ring 64, when the float rises, to seal the float chamber 66 from communication with the cavity 62 and bore 58.

When the manometer is in storage or is not in use, the valve screw 60 is maintained in its closed position so as to prevent any loss or contamination of the gauge fluid which might result from tipping or upsetting the instrument. When the instrument is in use, the valve screw 60 is ordinarily adjusted to open position so that the gauge column is vented to atmosphere. However, as will be more fully explained hereinafter, the instrument may be used with the valve screw in closed position so as to increase the upper limit of its range of test pressures.

When the instrument is used, as it is used most often, with the valve screws open, the float valve 35 serves to eliminate two serious problems which are ordinarily encountered in the use of test manometers. Both of these problems involve the inadvertent loss of the gauge fluid due to careless or unskilled operation of the instrument. In the one instance, the operator fails to observe the level of the gauge fluid in the gauge column as he is impressing the test pressure thereon. This causes the fluid level to rise gradually to a point where the fluid will escape through the vent channel 59. In the other instance, the operator, although alert to the level of the gauge fluid, may employ an air pressure source 48 which will inject a sudden large volume of air into the instrument and create an unexpected and violent surge of the gauge fluid to a level where it escapes from the vent channel 59.

In the first-cited instance, the float 67 will permit the air in the tube 12 or 13 to pass throuhg the valve 35 and vent to atmosphere during the gradual rise in the gauge fluid level. However, when the fluid reaches the level of the float 67, the float rises with the advancing fluid and seats upon the O-ring 64 to block any escape of the fluid through the vent passageway. This automatic sealing of the tube can immediately be sensed by the operator in his manipulation of the hand-operated air pump 48 and he can then relieve the pressure, permitting the gauge fluid level to drop. Ordinarily, the force of gravity will be sufficient to cause the float 67 to drop with the fluid level to restore the tube to vented condition. However, when the pressure is excessive, the conical seat 70 of the float 67 may be wedged into and frictionally retained by the O-rings 64 so that the gravitational force alone is not sufficient to displace it. Such "hanging" of the float 67 is minimized or completely prevented by the fact that the seat 70 is exposed to atmospheric pressure as the level of the fluid drops and this pressure is sufficient to dislodge the float from its frictional retention by the O-ring 64.

In the second instance which we have described, the sudden surge of the fluid in the tube 12 or 13 is accompanied by a similar surge of the column of air in the tube which attains a velocity and pressure sufficient to displace the float 67 and wedge it into the O-ring 64 before the fluid itself reaches the level of the float. This condition can be observed or sensed by the operator and, as soon as the pressure is relieved, the float 67 will return to its usual open position. In this manner, the float valve 35 automatically responds to a surge condition or to an excessive fluid level condition to seal the vent passageway 59 and prevent any inadvertent loss of the gauge fluid.

Another difficulty which is encountered in the use of conventional test manometers, is the pressure drop which results when the hand pump or aspirator 48 is uncoupled from the valve 50. This uncoupling is standard procedure, because the air pump 48 may itself have a leak which the manometer would reflect if the hand pump were not uncoupled from the instrument. This pressure loss or pressure drop can be of sufficient magnitude so as to bring the test pressure below the value which is desired for the test period. The hand pump must then be reconnected to the instrument and the pressure restored, with a consequent loss of time. Alternatively, when such pressure loss occurs frequently, the operator must impress a pressure upon the system which is sufficiently greater than the test pressure desired, to compensate for the pressure drop which will occur when the hand pump is uncoupled from the instrument. In order to overcome this difficulty, we have provided a coupling arrangement for the instrument which will prevent any pressure drop as a result of the uncoupling procedure. Although our improved coupling arrangement has its primary utility in connection with the coupling of the pressure source to the valve 50, we also find it desirable for use in coupling to the valve 47, although for that purpose conventional coupling means may be used.

Referring more particularly to FIGS. 7 and 8 of the drawings, we have shown the valve 50 having an externally threaded portion 71 for securing the valve in the cover 36 in communication with the bore 39. The opposite end of the valve has an externally threaded portion 72 which adjoins a cylindrical guide surface 73 of reduced diameter, having a circumferential recess 74 to accomodate an O-ring 75. The external diameter of the uncompressed O-ring 75 is slightly greater than the diameter of the guide surface 73.

The valve 50 is provided with a longitudinal bore 76 in which is mounted a spring-loaded check valve 77 which is unidirectionally pressure-responsive or can be manually opened by depressing a projecting pin 78. The valve 77 is of the type well known for use in pneumatic tires and therefore requires no detailed description. It will be understood that when the pin 78 is not depressed, the check valve 77 will serve to prevent any counter-flow through the valve 50 in the direction indicated by the arrow.

The coupling 46 includes a hollow body 79 having an externally threaded end 80 to which the hose or conduit 45 is connected. The end 80 is provided with an annular recess 81 to receive the end of the conduit 45 and securement is effected by means of a conventional compression ring 82 and nut 83.

The other end of the body 79 is of larger diameter to provide a bearing sleeve 84 whose internal diameter is slightly greater than the diameter of the guide surface 73. A knurled swivel nut 85 is rotatably mounted on the body 79 adjacent to a retaining shoulder 86 of the body. An apertured spider element 87, having a central abutment portion 88 is mounted within the bearing sleeve 84.

To connect the conduit 45 to the valve 50, the swivel nut 85 is brought into engagement with the end 72 of the valve 50 and turned to effect the threaded securement. It will be noted that the length of the bearing sleeve 84 is somewhat greater than the length of the threaded portion of the swivel nut 85. Thus, the sleeve 84 will engage the compressible sealing ring 75 during the initial engagement of the coupling 46 with the valve 50 and before the swivel nut 85 is sufficiently advanced to threadedly engage the portion 72. As the swivel nut 85 threadedly engages the valve body and is turned, it draws the bearing sleeve toward the valve causing the abutment 88 on the spider element 87 to engage and depress the check valve pin 78. The check valve 77 is thus made inoperative when the coupling 46 has been connected to the valve 50, and the pressurized air supplied by the hand pump 48 can flow freely through the apertured spider element 87 through the valve 50 and into the test system.

When the test pressure has been achieved, as indicated on the manometer scale, the hand pump 48 is uncoupled from the manometer valve 50. The swivel nut 85 is unscrewed, causing the bearing sleeve 84 to be retracted relatively to the guide surface 73 and causing the spider element 87 to become disengaged from its abutment with the check valve pin 78. This occurs before the swivel nut 85 has been fully released from its threaded engagement with the valve 50. The check valve 77 has thus been restored to operative condition to prevent any outflow through the valve 50 while the test system is still sealed by the inter-engagement of the bearing sleeve 84 with the O-ring 75. Therefore, when the swivel nut is finally disconnected and the coupling is removed, there has been no opportunity for an escape of air from the test system and consequently no pressure drop resulting from the uncoupling of the pressure source. This coupling arrangement permits the use of a strong, positive acting check valve 77 in the valve 50, which would not ordinarily open in response to the low test pressures which are required to be impressed upon the manometer during many test conditions. The mechanical depression of the pin 78 by the coupling 46 overcomes this difficulty, while the dual seal arrangement provided by the check valve 77 and the O-ring 75 establishes a sequential sealing of the test system so as to prevent any pressure drop during the uncoupling. It will also be noted, that an additional seal between the valve 50 and the coupling 46 is provided by the abutment of the end of the portion 73 of the valve with the periphery of the spider element 87, when the coupling 46 is fully connected.

In FIGS. 9 and 10 of the drawings, we have shown details of two forms of adapters which, as indicated in FIG. 4 of the drawings, can be utilized to quickly and easily connect the manometer to the gas line to be tested, without the use of tools.

Referring more particularly to FIG. 9 of the drawings, we have shown a cross-section of the connection adapter 44 as utilized for coupling to the meter spud 89 of a gas line system. The adapter includes a body 90 and a valve assembly 91. The body 90 is provided with two oppositely disposed externally threaded portions 92 and 93 which are of different diameters and represent the meted spud thread sizes most commonly encountered. The body is provided with a central bore 94 extending longitudinally therethrough, which is counterbored from the opposite ends thereof, as at 95 to leave an intermediate short section of the bore 94, which is threaded as indicated.

A laterally extending port 96 is provided in the wall of the body 90 and communicates with the counterbore 95 to one side of the threaded portion 94. The port 96 is provided with internal threads to receive a conventional threaded connector provided on one end of the connecting hose 45. A branch channel 97 provides communication between the port 96 and a counterbore 95 to the other side of the threaded portion 94.

The valve assembly 91 includes a threaded stem 98 which engages the central bore 94. On opposite sides of the threaded section 94, the valve stem defines annular passageways 99 and 100, respectively, in the divided counterbore 95. It will be noted that the passageway 99 has communication directly with the port 96, whereas the passageway 100 has communication with the port through the branch channel 97.

The opposite ends of the counterbore 95 are tapered, as at 101, to provide seats for the valve bodies 102 which are fixedly secured to the opposite ends of the valve stem. Each valve body 102 includes a conical section 103 which is adapted to be received in the seat 101. The conical section 103 is provided with a circumferential recess 104 to accommodate an O-ring 105 which is adapted to be compressed in sealing engagement with the tapered seat 101. Each valve body 102 also has a knurled finger grip portion 106 for ease in manually rotating the valve stem. It will be noted that the distance between the opposed conical sections 103 is greater than the comparable distance between the opposed valve seats 101. Thus, the valve stem can be rotated in one direction or the other to bring either one of the valve bodies 102 into sealing engagement with its adjacent valve seat 101. In this way, either end of the counterbore 95 can be sealed. The valve stem can also be rotated to an intermediate position where neither of the valve bodies is in sealing engagement with the counterbore 95.

The adapter 44 is connected to the meter spud 89, as indicated in the drawing. The threaded connection is here shown as being made on the larger thread diameter 93 of the adapter, but it will be understood that the connection would be made to either the portion 92 or the portion 93, depending upon the spud size involved. Radially extending arms or projections 107 are affixed to the exterior of the body 90 to provide hand grips for conveniently rotating the adapter 44 into threaded connection with the meter spud. Inasmuch as such spuds are ordinarily provided with a sealing gasket 108 the manual rotation of the adapter is sufficient to compress the gasket and effect a seal with the meter spud, without the use of auxiliary tools.

With the valve assembly 91 disposed in the position shown in FIG. 9, the exposed valve body 102 seals the external end of the counterbore 95, whereas the concealed valve body 102 is in open position, permitting communication between the port 96 and the gas line through the channel 97 and the annular passage 100. The gas line is thus brought into communication with the valve 47 on the manometer by means of the connecting hose 45 and the coupling 46, previously described.

It will be observed that, if any bleeding of the gas line is required, it is not necessary to disconnect the adapter or any other portion of the system, since such bleeding can be accomplished by rotating the valve assembly 91 to its intermediate position, thereby venting the counterbore 95 to atmosphere. Similarly, the valve assembly 91 may be rotated to a position where the concealed valve body 102 seals on its adjacent seat 101 and thus closes off the gas line from communication with the port 96, if for any reason this becomes necessary.

It will be apparent that the same principles of connection would apply if the meter spud were connected to the opposite end of the adapter 44. In that case, however, the gas line would communicate with the port 96 through the annular passageway 99.

In FIG. 10, we have shown another form of connecting adapter 52, in which the principle of operation and the valving arrangement are identical to that previously described with respect to the adapter 44. However, the adapter 52 has a body 109 which is adapted to be connected to an internally threaded gas line 110. The body 109 is provided with three externally threaded portions 111, 112 and 113 of different diameters to accommodate different sizes of gas lines. Soft sealing gaskets 114, 115 and 116 are mounted on the body 109 adjacent to the threaded portions 111, 112 and 113, respectively, to provide a compressible seal which will conform to any irregularities on the end face of the gas line 110 when one of the gaskets is compressed as the adapter 52 is threadedly secured to the gas line by manual rotation of the body 109 through use of the radial arms 107. Thus, the pipe threads are utilized for mechanical securement and are not relied upon for a sealing connection.

By means of the connecting adapters 44 and 52, which are adapted for connection to the most commonly encountered sizes of gas lines and meter spuds, the connection between the test manometer and the gas line to be tested can be made quickly without the use of tools.

We have previously described the operation of our manometer in sufficient detail so that its mode of use will be apparent to those skilled in the art. The mercury gauge column is used for relatively large values of test pressures, for example, up to 11 pounds per square inch. To this end, the back 15 of the instrument is provided with a mercury scale A calibrated in inches of mercury, and a mercury scale B calibrated in pounds per square inch. The water column is ordinarily used for relatively lower test pressures, for example, up to 14 ounces per square inch. However, if the vent assembly 33 is closed by means of the valve screw 60 when the manometer is in use, the tube 12 no longer is open to atmosphere and the entrapped air therein is compressed, rather than vented, when the water column rises as a result of the test pressures applied. Thereby, the water gauge column can be utilized for high pressure testing, even beyond the range of the mercury column. To this end, the back 15 is provided with a water scale C which is calibated in pounds per square inch, a water scale D which is calibrated in ounces per square inch and a water scale E which is calibrated in inches of water. In normal low pressure use of the water column, readings are taken on the scales D or E. When the column is used for high pressure, readings are taken on the scale C.

From the foregoing description it will be apparent that we have provided a compact and effective dual manometer which is readily adapted for versatile use in a gas test system and attains the stated objectives herein previously set forth.

It is to be understood that the forms of our invention, herewith shown and described, are to be taken as preferred examples of the same, and that various changes in the shape, size, and arrangement of parts may be resorted to, without departing from the spirit of our invention, or the scope of the subjoined claims.

Having thus described our invention, we claim:

1. In a test manometer, the combination of a first pressure gauge column, a second pressure gauge column contained within said first gauge column, reservoir means for supplying gauge fluids to each of said gauge columns, fluid pressure inlet means connected to said reservoir means, and scale devices associated with said columns whereby the level of the gauge fluid in each of said columns indicative of fluid pressure may be determined.

2. A combination as defined in claim 1, wherein said pressure gauge columns are coaxial.

3. A combination as defined in claim 1, wherein said first pressure gauge column contain a selected gauge fluid which is dissimilar to the gauge fluid contained in said second gauge column.

4. In a test manometer, the combination of a first pressure gauge column, a second pressure gauge column disposed within said first gauge column and defining an annular space therein, a supporting base common to said gauge columns, reservoir chambers provided in said base for supplying gauge fluids to each of said columns, fluid pressure inlet means communicating with each of the reservoir chambers, and scale means on said base to provide a readout of the levels of the gauge fluids in the columns in terms of fluid pressure.

References Cited by the Examiner

UNITED STATES PATENTS

| 1,590,141 | 6/1926 | Weaver | 73—401 |
| 1,593,680 | 7/1926 | Teter | 73—401 X |
| 2,430,034 | 11/1947 | Stern | 73—40.5 |
| 2,594,649 | 4/1952 | Hodshire | 73—401 |
| 2,788,658 | 4/1957 | Liden et al. | 73—40.5 |
| 3,091,115 | 5/1963 | Roberts | 73—73 |
| 3,120,127 | 2/1964 | Parrish | 73—401 |

LOUIS R. PRINCE, *Primary Examiner.*

ROBERT EVANS, RICHARD QUEISSER, *Examiners.*